J. E. WILD.
GEAR RING FOR FLY WHEELS.
APPLICATION FILED MAR. 1, 1916.
1,192,590.
Patented July 25, 1916.
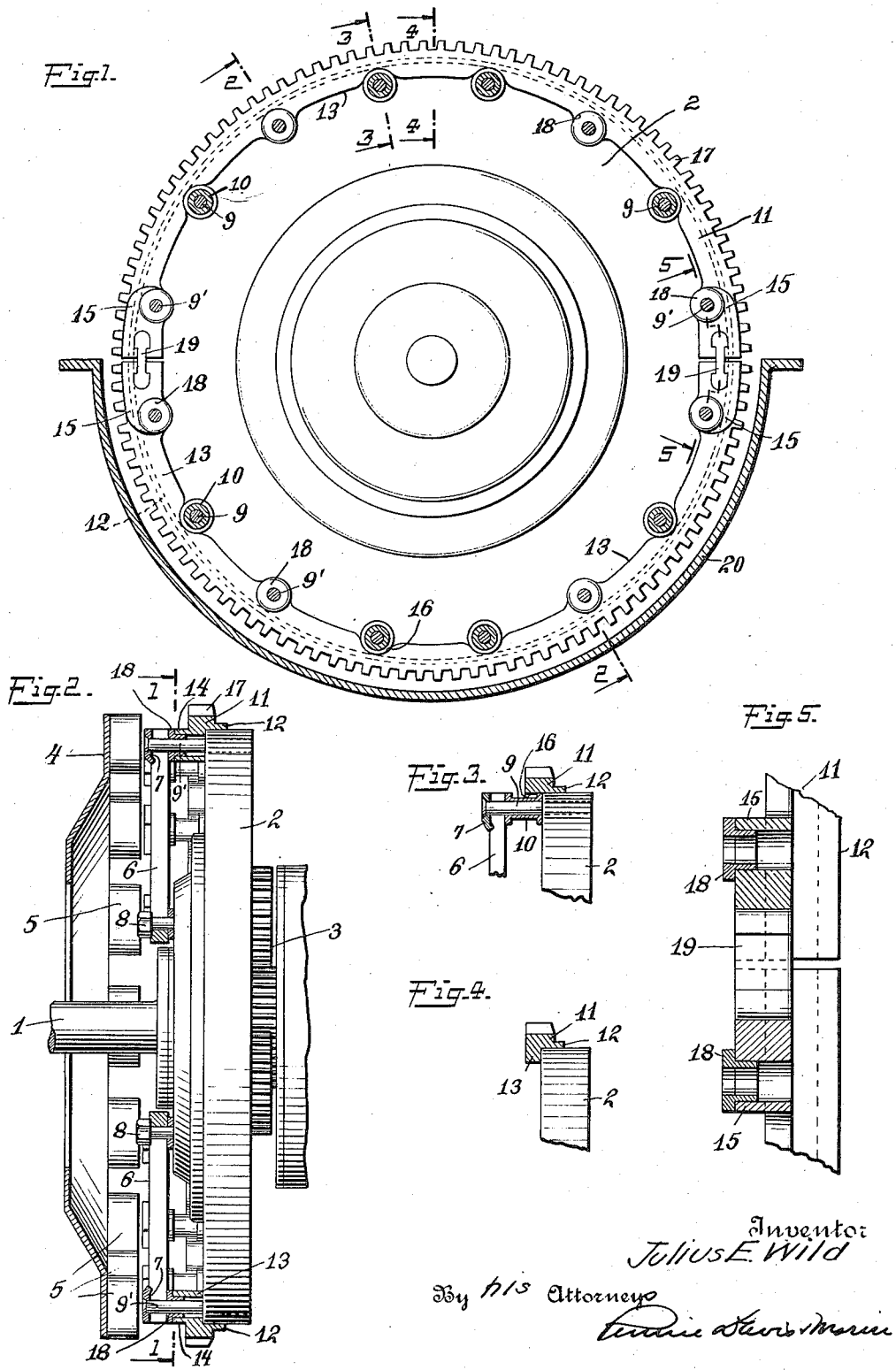
Inventor
Julius E. Wild
By his Attorneys

UNITED STATES PATENT OFFICE.

JULIUS E. WILD, OF PLAINFIELD, NEW JERSEY, ASSIGNOR TO BOSCH MAGNETO COMPANY, OF NEW YORK, N. Y., A CORPORATION OF NEW YORK.

GEAR-RING FOR FLY-WHEELS.

1,192,590.

Specification of Letters Patent.

Patented July 25, 1916.

Application filed March 1, 1916. Serial No. 81,345.

*To all whom it may concern:*

Be it known that I, JULIUS E. WILD, a subject of the Emperor of Germany, and a resident of and whose post-office address is Plainfield, county of Union, State of New Jersey, have invented certain new and useful Improvements in Gear-Rings for Fly-Wheels; and I do hereby declare the following to be a full, clear, and exact description of the invention, such as will enable others skilled in the art to which it appertains to make and use the same.

In installing gear rings on apparatus which is housed, as for instance on an engine fly wheel whose lower half is inclosed by an integral extension of the crank casing, it is sometimes difficult, if not impossible, to fit a one-piece gear ring to the fly wheel without removing the casing. However, if the gear ring is made up of segments so as to be installed as different portions of the fly wheel are turned to the top, then there is difficulty in properly maintaining the segments in a rigid ring and fastening them rigidly to the fly wheel, especially if unskilled labor and ordinary appliances are to suffice for the work. The gear ring herein disclosed meets these requirements, and, in addition thereto, obviates the necessity of mutilating the engine equipment with which it is associated, the result being attained by fastening connecting members to the adjacent ends of abutting segments to form the segments into a rigid ring and fastening the ring rigidly to the fly wheel by fastening devices passing through the segments into the fly wheel. In fastening two half segments together in this way, one connecting member is fastened into place across one joint between the segments, and then the other connecting member is fastened into place across the other joint after the abutting ends at that joint are drawn into proper relation by a simple clamping tool, the fastening devices passing through the segments into the fly wheel being secured in place to hold the gear ring rigidly thereto.

This invention also comprehends the use of gear rings of one piece or of segmental form in combination with certain types of equipments like a Ford automobile engine combined with an electric generator, wherein the magnetic circuit of the generator should not be short-circuited by the gear ring or by the fastening devices therefor. If this requirement is met by using a gear ring of non-magnetic material of sufficient strength such as high percentage nickel steel or manganese bronze, then the cost is too great, and if a more inexpensive non-magnetic material as brass or bronze is used, then the gear ring is lacking in sufficient strength to withstand the stresses due to centrifugal action. The gear ring specifically disclosed herein is of cast steel magnetically insulated from the generator by interposing brass pieces between the two and by using high percentage nickel steel bolts for connecting the gear ring rigidly to the fly wheel. In this way, the requisite strength is obtained at a reasonable cost, and the parts are rigidly fastened to the fly wheel without short-circuiting the magnetic structure of the generator.

In the accompanying drawings illustrating the preferred construction in application, as an example, to a Ford automobile engine of the well known kind, for the purpose of starting the engine from rest by means of a motor starter of the electric or other type, Figure 1 is a front view of the gear ring in place with some of the fastening devices in section on line 1—1 of Fig. 2; and Figs. 2, 3, 4 and 5 are sections on lines 2—2, 3—3, 4—4 and 5—5, respectively, of Fig. 1.

The crank shaft 1 of the engine carries a fly wheel 2 and the planetary speed change gearing 3. The iron plate 4 is stationary and carries a plurality of axially-extending wound poles 5 coöperating with a plurality of rotatable horse-shoe magnets 6 for producing current for ignition purposes, as is well known. The magnets are set around a circle with their arms extending to the pole pieces 7, the magnets being fastened to the fly wheel 2 by bolts 8 extending through the arches of the magnets, and the pole shoes being fastened to the fly wheel by bolts 9 and 9'. In this arrangement, it is necessary, in addition to providing for the mechanical support of the magnets, to magnetically insulate them from the fly wheel 2, so that the magnetic flux will, in its substantial entirety, pass from the rotating pole shoes 7 to the stationary wound poles 5. This is accomplished in the ordinary Ford engine equipment by making the bolts 9 and 9' of brass and interposing a spacing spool 10 of brass between the fly wheel and each of the pole shoes 7 to form a rigid and magnetically insulating support throughout.

In order to drive the fly wheel by a starting motor in starting the engine from rest, a gear ring 11 is rigidly fastened to the fly wheel by magnetically insulating fastening means. Inasmuch as this engine is provided with an integral extension 20 of the crank shaft casing inclosing the lower half of the fly wheel, the planetary gearing and the clutch behind the fly wheel, the gear ring is segmental so that the segments can be slipped on the fly wheel as the successive portions thereof are turned to the top to an exposed position when the detachable top of the extension of the gear casing is removed. The gear ring 11 is of cast steel preferably cast in one piece with a laterally directed flange 12 adapted to closely fit the periphery of the fly wheel, and with an inwardly directed flange 13 having perforated bosses 14 and 15 and the clearance recesses 16, the inwardly directed flange being adapted to abut the side of the fly wheel. The teeth 17 are cut and the one-piece ring is sawed into halves through the bosses 15. The spacing bushings 18 are of brass and set loosely in the bosses 14 and 15, as shown.

Now, in order to fasten the gear ring in place, suitable ones of the original bolts used for fastening the magnets to the fly wheel are removed in turn through the space between adjacent wound poles 5 at the top. One of the halves of the gear ring is set on the upper half of the fly wheel with the laterally directed flange 12 resting on the periphery of the fly wheel and the inner face of the inwardly directed flange 13 abutting the side of the fly wheel. The clearance recesses 16 obviate the necessity for removing the bolts 9 and spools 10. The new bolts 9' replacing original brass bolts like 9, are of high percentage nickel steel which, as a practical matter, is non-magnetic, and pass through the bosses 14 and 15 into the fly wheel, the bosses 14 and 15 and the bushings 18 taking the place of spools 10 installed there in the original Ford equipment. After one segment of the gear ring has been fitted to the fly wheel in this way, the fly wheel is turned around and the other segment is set on the other half of the fly wheel. One of the I-form steel connecting members 19 is driven in place to hold the adjacent ends of the gear ring segments in rigid relation to each other, and the opposite adjacent ends of the segments are sprung into position, for driving the other connecting member 19 into place, by means of a clamping tool which grips the outer faces of the bosses 15. The remaining bolts 9' are then inserted as the fly wheel is turned from place to place to permit the entrance of a screw driver between the wound poles 5. The laterally directed flange 12 then closely fits the periphery of the fly wheel, and the inwardly directed flange is forced into intimate contact with the side of the fly wheel, thus assisting in maintaining the equipment in permanent rigid relation. After replacing the upper part of the extension of the crank casing, the installation is complete. It will be observed that in this arrangement the segments are held by the connecting members 19 in a rigid ring, so that all the fastening devices 9' passing through the bosses of the segments assist in maintaining the rigidity of the structure when driving torque from the starting motor is applied to a single one of the segments. Furthermore, the connecting members 19 are assisted by the fastening devices 9' in withstanding the stresses acting to dislodge the gear ring as a result of centrifugal action. Also, the magnetic circuit of the generator is not short-circuited even though a cast steel gear ring is used. In fact, tests have shown that the voltages generated at different speeds of the generator herein shown are substantially identical with the voltages generated at the same speeds with the original Ford equipment, and that the strength of the structure is ample to withstand the torque of the starting motor and the centrifugal force effective on the gear rings at the maximum speed of the engine.

Having thus described my invention, what I claim is:

1. The combination with the fly wheel of an engine, of a segmental gear ring made up of segments each having a laterally directed flange closely fitting the periphery of the fly wheel and an inwardly directed flange abutting the side of the fly wheel and having perforated bosses, and fastening devices passing through the bosses and into the fly wheel for fastening the segments rigidly thereto, substantially as described.

2. The combination with the fly wheel of an engine, of a segmental gear ring having perforated bosses, connecting members fastened to the bosses adjacent the abutting ends of the segments to hold the segments in a rigid ring, and fastening devices passing through the other bosses and into the fly wheel to fasten the ring rigidly thereto; substantially as described.

3. The combination with the fly wheel of an engine, and a plurality of magnets, of a gear ring of magnetic material having perforated bosses, non-magnetic spacing members interposed between the bosses and the magnets, and fastening devices of non-magnetic material passing through some of the magnets and through the bosses into the fly wheel to fasten those magnets and the gear ring rigidly to the fly wheel; substantially as described.

4. The combination with the fly wheel of an engine, and a plurality of magnets, of a gear ring of magnetic material having perforated bosses and clearance recesses between certain ones of the bosses, spacing members of non-magnetic material interposed between the bosses and the magnets, fastening devices passing through some of the magnets and through the bosses into the fly wheel to fasten those magnets and the gear ring rigidly to the fly wheel, and other fastening devices of non-magnetic material passing through the other magnets and the clearance recesses to fasten those magnets rigidly to the fly wheel; substantially as described.

5. The combination with the fly wheel of an engine, and a plurality of magnets, of a segmental gear ring of magnetic material having perforated bosses and clearance recesses between certain ones of the bosses, spacing members of non-magnetic material interposed between the bosses and the magnets, connecting members fastened to the bosses adjacent the abutting ends of the segments to hold the segments in a rigid ring, fastening devices of non-magnetic material passing through some of the magnets and the bosses into the fly wheel to fasten those magnets and the gear ring rigidly to the fly wheel, and other fastening devices of non-magnetic material passing through the other magnets and the clearance recesses into the fly wheel to fasten those magnets rigidly to the fly wheel; substantially as described.

6. The combination with the fly wheel of an engine, and a plurality of magnets, of a gear ring of magnetic material made up of segments each having a laterally directed flange closely fitting the periphery of the fly wheel and an inwardly directed flange abutting the side of the fly wheel and having perforated bosses and clearance recesses between certain ones of the bosses, spacing members of non-magnetic material interposed between the bosses and the magnets, connecting members fastened to the bosses adjacent the abutting ends of the segments to hold the segments in a rigid ring, fastening devices of non-magnetic material passing through some of the magnets and the bosses into the fly wheel to fasten those magnets and the gear ring rigidly to the fly wheel, and other fastening devices of non-magnetic material passing through the other magnets and the clearance recesses into the fly wheel to fasten those magnets rigidly to the fly wheel; substantially as described.

7. The combination with the fly wheel of an engine, of a segmental gear ring made up of segments each having a laterally directed flange closely fitting the periphery of the fly wheel and an inwardly directed flange abutting the side of the fly wheel and having perforated bosses, connecting members fastened to the bosses adjacent the abutting ends of the segments to hold the segments in a rigid ring, and fastening devices passing through the other bosses and into the fly wheel to fasten the ring rigidly thereto; substantially as described.

8. The combination with the fly wheel of an engine, and an electric generator, of a segmental gear ring of magnetic material, and magnetically insulating fastening means rigidly connecting the gear ring and the rotatable element of the generator to the fly wheel; substantially as described.

In testimony whereof I affix my signature.

JULIUS E. WILD.